United States Patent
Zaech

(10) Patent No.: US 12,241,510 B2
(45) Date of Patent: Mar. 4, 2025

(54) COMPENSATING COUPLING

(71) Applicant: Siemens Mobility GmbH, Munich (DE)

(72) Inventor: Martin Zaech, Raubling (DE)

(73) Assignee: Siemens Mobility GmbH, Munich (DE)

( * ) Notice: Subject to any disclaimer, the term of this patent is extended or adjusted under 35 U.S.C. 154(b) by 420 days.

(21) Appl. No.: 17/787,966

(22) PCT Filed: Nov. 25, 2020

(86) PCT No.: PCT/EP2020/083410
§ 371 (c)(1),
(2) Date: Jun. 22, 2022

(87) PCT Pub. No.: WO2021/129994
PCT Pub. Date: Jul. 1, 2021

(65) Prior Publication Data
US 2023/0029019 A1    Jan. 26, 2023

(30) Foreign Application Priority Data
Dec. 23, 2019  (DE) ..................... 10 2019 220 560.7

(51) Int. Cl.
*F16D 3/62*      (2006.01)
*F16D 3/06*      (2006.01)
(52) U.S. Cl.
CPC ................. *F16D 3/62* (2013.01); *F16D 3/06* (2013.01); *F16D 2200/006* (2013.01); *F16D 2200/0078* (2013.01)

(58) Field of Classification Search
CPC ........ F16D 3/62; F16D 3/06; F16D 2200/006; F16D 2200/0078
USPC .......................................................... 464/69
See application file for complete search history.

(56) References Cited

U.S. PATENT DOCUMENTS

| | | | |
|---|---|---|---|
| 2,561,117 | A | 7/1951 | Hoffer |
| 4,040,270 | A | 8/1977 | Chivari |
| 4,588,388 | A | 5/1986 | Chivari |
| 9,512,885 | B2 | 12/2016 | Huber et al. |

FOREIGN PATENT DOCUMENTS

| | | |
|---|---|---|
| DE | 3732705 A1 | 4/1989 |
| DE | 19839451 A1 | 3/1999 |
| DE | 19744244 A1 | 4/1999 |
| DE | 102012001450 A1 | 8/2013 |

(Continued)

*Primary Examiner* — Greg Binda
(74) *Attorney, Agent, or Firm* — Laurence A. Greenberg; Werner H. Stemer; Ralph E. Locher

(57) ABSTRACT

A compensating coupling connects a first shaft to a second shaft along an axis of rotation. The compensating coupling has a first coupling body connected to an end of the first shaft and a second coupling body connected to an end of the second shaft. At least one elastic coupling element has a longitudinal axis lying in a plane that is oriented perpendicularly to the axis of rotation. The two coupling bodies are arranged with respect to one another to form a three-dimensional coupling region in which the elastic coupling element is arranged. The elastic coupling element is connected to the two coupling bodies such that the two coupling bodies are displaceable in the radial direction with respect to the axis of rotation. The elastic coupling element is displaceable in the axial direction with respect to the axis of rotation.

3 Claims, 4 Drawing Sheets

(56) References Cited

FOREIGN PATENT DOCUMENTS

| | | |
|---|---|---|
| DE | 102012014652 A1 | 1/2014 |
| DE | 102014002891 A1 | 9/2015 |
| FR | 1325013 A | 4/1963 |
| GB | 1345036 A | 1/1974 |
| WO | 2013023743 A1 | 2/2013 |

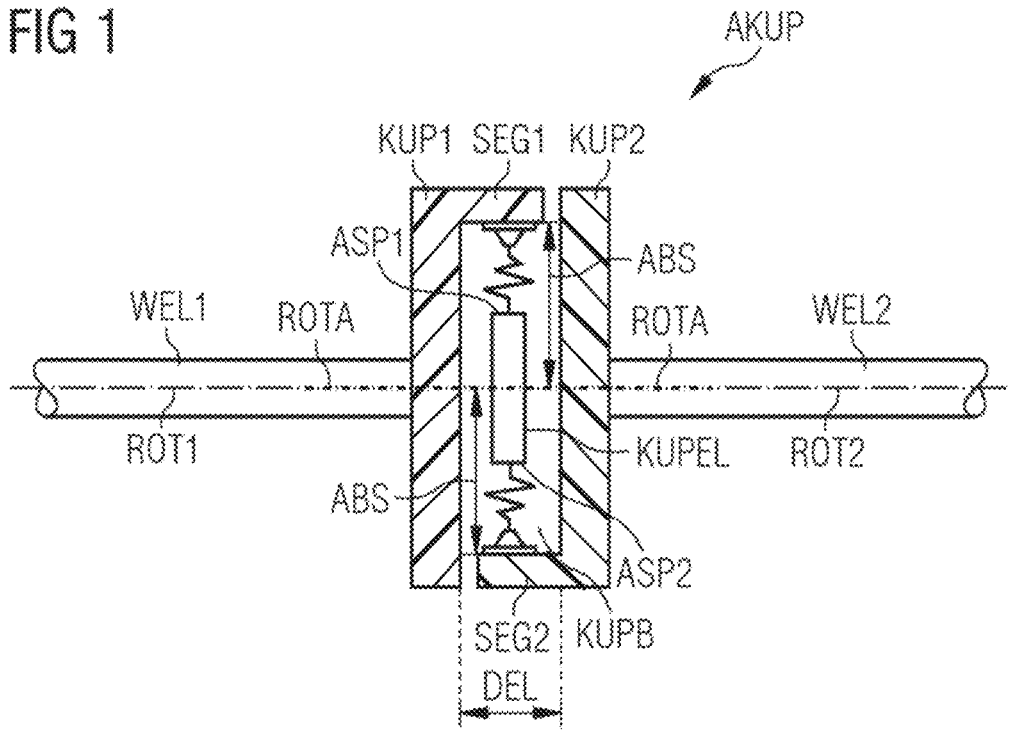
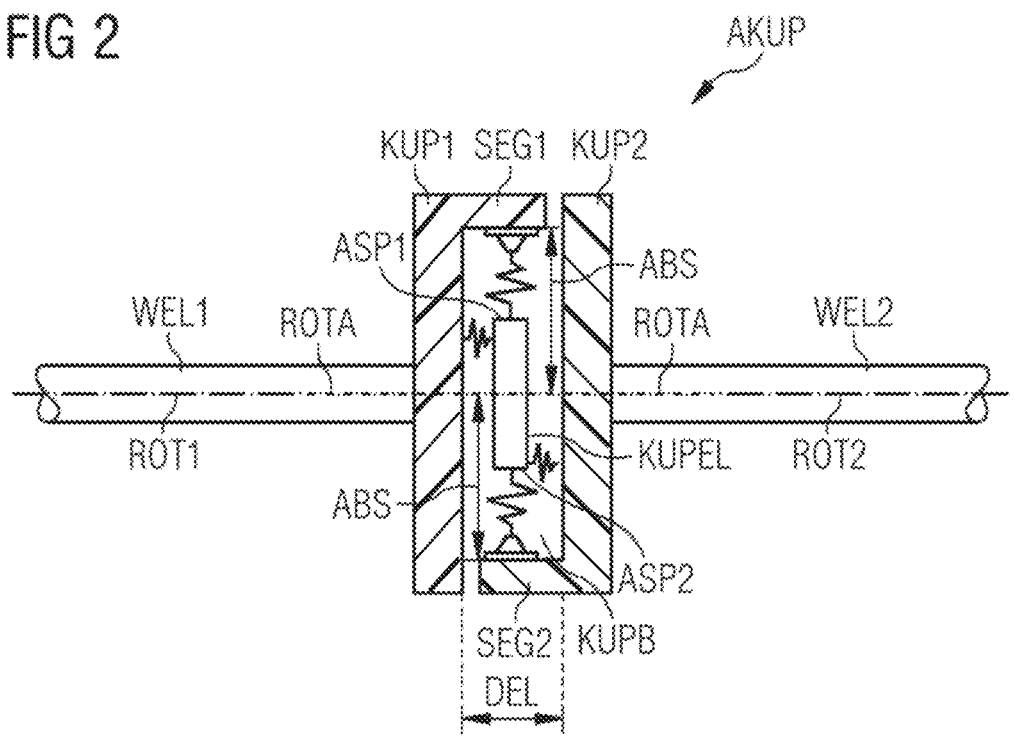

COMPENSATING COUPLING

FIELD AND BACKGROUND OF THE INVENTION

The invention relates to a compensating coupling for rail vehicles.

Couplings or compensating couplings according to the known prior art are described, for example, in the following documents: U.S. Pat. No. 2,561,117 A, GB 1345036 A, FR 1325013 A1, DE 19839451 A1 or DE 19744244 A1.

A compensating coupling transmits rotational speeds from a first shaft to a second shaft without converting them. The compensating coupling is used to compensate for mechanical deviations, for example:
- if the longitudinal axes of the two shafts are not aligned with one another, with the result that radial misalignment or angular misalignment of the longitudinal axes of the shafts occurs,
- if the length of the two shafts changes due to changes in temperature, or
- if assembly inaccuracies which lead to radial misalignment or angular misalignment of the longitudinal axes of the shafts have to be compensated.

A compensating coupling is of rotationally rigid embodiment. Torques are transmitted, for example, in a positively engaging manner via claws, teeth, sliding joints or via journals in bearing bushings. Shocks and oscillations are transmitted by the compensating couplings in accordance with their rigidity.

A compensating coupling for connecting two shafts which has at least one elastic body in the coupling region is known:

In this case, a first shaft is connected at one of its ends to a first coupling body, which is part of the compensating coupling. Correspondingly, a second shaft is connected at one of its ends to a second coupling body, which is likewise part of the compensating coupling. Arranged between the first and the second coupling body is at least one elastic body which is used to couple the two coupling bodies to one another. This makes it possible for the two coupling bodies to move relative to one another.

A problematic property of this form of the compensating coupling is that, due to the geometrical arrangement of the elements of the compensating coupling, the torque transmitted from the first shaft to the second shaft affects the axial rigidity of the compensating coupling.

The transmission of torque between the two shafts is effected by the transmission of force between the connection points which connect the elastic body to the two coupling bodies. Depending on the configuration of the coupling elements or due to the position of the connection points, a corresponding force vector of the transmission may have radial and axial force components which act on the two shafts.

These radial and axial force components are generally dependent on the deflection of the coupling elements. In this case, the radially and axially acting force components constitute an additional restoring force which influences the overall rigidity of the compensating coupling.

The overall rigidity defines a reaction force of the compensating coupling to an applied displacement and is influenced by a restoring force which is caused by the reaction force of the elastic elements of the compensating coupling to the deflection of the compensating coupling, and by a restoring force on account of the transmission of torque.

This has the effect that the overall rigidity of the compensating coupling in the case of a radial and axial displacement is dependent both on the displacement and on the currently transmitted torque.

By way of example, in the case of a radial deflection, a torque acting on the compensating coupling brings about a radially directed first force. In the case of an axial deflection of the compensating coupling, an axial second force is formed. Both forces are coupled with the acting torque.

This coupling has the effect that an axial and radial rigidity of the compensating coupling is ultimately dependent on the transmitted torque, which is undesirable in the design of running gears of rail vehicles.

SUMMARY OF THE INVENTION

It is therefore the object of the present invention to design a compensating coupling in such a way that its axial rigidity is only slightly dependent or not at all dependent on the transmitted torque.

This object is achieved by the features as claimed. Advantageous refinements are specified in the respective dependent claims.

The invention relates to a compensating coupling, preferably for rail vehicles, for connecting a first shaft to a second shaft along a rotational axis.

The compensating coupling includes a first coupling body which can be connected to an end of a first shaft, and a second coupling body which can be connected to an end of a second shaft.

The compensating coupling includes at least one elastic coupling element, the longitudinal axis of which lies in a plane which is oriented perpendicularly with respect to the rotational axis.

The two coupling bodies are arranged relative to one another in such a way that a three-dimensional coupling region is formed in which the at least one elastic coupling element is arranged between the two coupling bodies.

The elastic coupling element is connected to the two coupling bodies in such a way that the coupling bodies can be displaced in a radial direction with respect to the rotational axis.

This is achieved due to the elasticity of the coupling element.

The elastic coupling element is additionally connected to the two coupling bodies in such a way that the coupling element can be displaced in an axial direction with respect to the rotational axis.

This makes it possible for the two coupling bodies to also be able to be displaced relative to one another in the axial direction.

In a preferred refinement, an end of the first shaft is connected to the first coupling body, while an end of the second shaft is connected to the second coupling carrier. This connection is such that respective longitudinal axes of the two shafts coincide with the rotational axis of the compensating coupling.

In a preferred refinement, the two coupling bodies are configured in a rotationally symmetrical manner with respect to the rotational axis.

In a preferred refinement, the at least one elastic coupling element is a fiber-reinforced polymer.

In a preferred refinement, the at least one elastic coupling element is of strip-like configuration and has a cylindrical or cuboid basic shape.

In a preferred refinement, the first coupling body has a segment which is configured for connecting the first coupling body to a first end of the elastic coupling element. This connection is designed in such a way that the longitudinal axis of the elastic coupling element lies in a plane which is perpendicular to the rotational axis.

In a preferred refinement, the second coupling body has a segment which is configured for connecting the second coupling body to a second end of the elastic coupling element. This connection is designed in such a way that the longitudinal axis of the elastic coupling element lies in the plane which is perpendicular to the rotational axis.

In a preferred refinement, the first end of the elastic coupling element is additionally connected to an inner side of the first coupling body in a resilient manner, wherein this inner side is oriented perpendicularly with respect to the rotational axis and the inner side points toward the interior of the three-dimensional coupling region.

In a preferred refinement, the second end of the elastic coupling element is additionally connected to an inner side of the second coupling body in a resilient manner, wherein this inner side is oriented perpendicularly with respect to the rotational axis and the inner side points toward the interior of the three-dimensional coupling region.

This spring force brings about a centering action in the axial direction.

A compensating coupling whose rigidity is only slightly dependent or not at all dependent on the transmitted torque is obtained by means of the present invention.

The present invention permits new drive concepts using the compensating coupling according to the invention, with advantages in terms of performance, effectiveness and costs of the drive concept being obtained.

BRIEF DESCRIPTION OF THE FIGURES

The present invention will be explained in more detail below by way of example on the basis of a drawing, in which:

FIG. 1 shows a basic illustration of the present invention,

FIG. 2 shows a basic illustration of an advantageous refinement of the present invention in respect of FIG. 1.

DETAILED DESCRIPTION OF THE INVENTION

Figure 3:
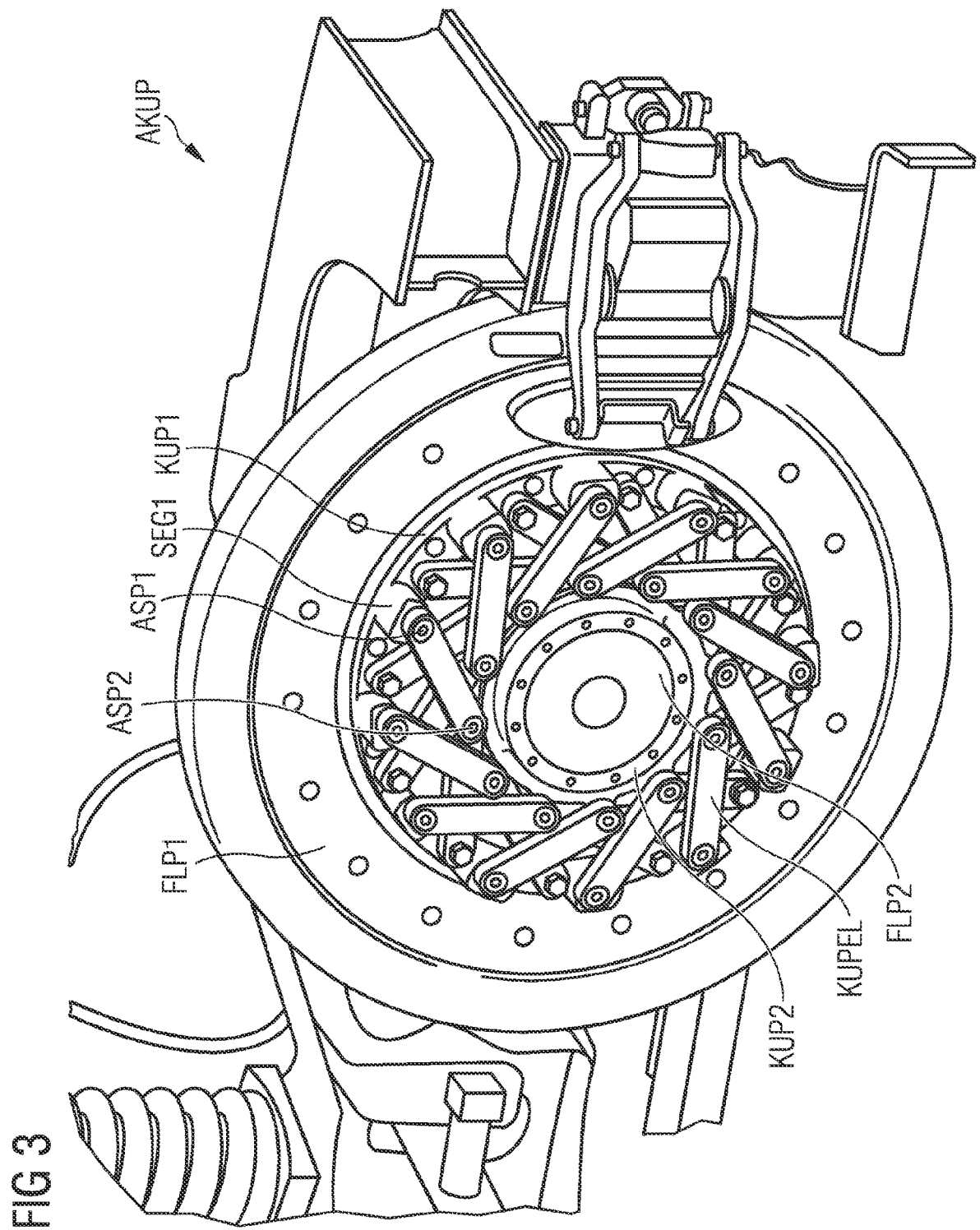
FIG. 3 is a perspective view of a running gear of a rail vehicle showing a specific configuration of the invention in respect of FIG. 1 and FIG. 2.

FIG. 1 shows a basic illustration of the present invention.

A compensating coupling AKUP axially connects a first shaft WEL1, which has a first rotational axis ROT1, to a second shaft WEL2, which has a second rotational axis ROT2.

As a result of this connection, the two rotational axes ROT1, ROT2 form a common rotational axis ROTA.

The first shaft WEL1 is connected at one end to a first coupling body KUP1, which is part of the compensating coupling AKUP.

The second shaft WEL2 is connected at one end to a second coupling carrier KUP2, which is likewise part of the compensating coupling AKUP.

The two coupling bodies KUP1, KUP2 are preferably configured in a rotationally symmetrical, for example cylindrical, manner with respect to the rotational axis ROTA.

The two coupling bodies KUP1, KUP2 are arranged relative to one another in such a way that they form a three-dimensional coupling region KUPB.

In this case, the two coupling bodies KUP1, KUP2 are arranged relative to one another in such a way that they at least partially enclose, and thus form, a three-dimensional coupling region KUPB.

In the example shown here, the three-dimensional coupling region KUPB is defined by way of a first distance ABS and by way of a second distance DEL.

In this case, the first distance ABS is determined by the distance of segments SEG1, SEG2 from the common rotational axis ROTA, viewed in the radial direction with respect to the rotational axis ROTA.

The second distance DEL is determined by the distance between the mutually facing inner sides of the two coupling bodies KUP1, KUP2, viewed in the axial direction, that is to say longitudinally with respect to the rotational axis ROTA.

At least one elastic coupling element KUPEL is arranged in the coupling region KUPB. The elastic coupling element KUPEL has a longitudinal axis which lies in a plane, the rotational axis ROTA being oriented perpendicularly with respect to this plane.

In this case, the elastic coupling element KUPEL is preferably in the form of a fiber-reinforced polymer.

The elastic coupling element KUPEL is preferably of strip-like configuration, preferably having a cylindrical or cuboid basic shape.

The first coupling body KUP1 has at least one segment SEG1 which is configured for connecting the first coupling body KUP1 to a first end ASP1 of the elastic coupling element KUPEL.

This connection is in this case designed in such a way that the above-described position of the longitudinal axis of the elastic coupling element KUPEL in the plane which is perpendicular to the rotational axis ROTA is realized.

The second coupling body KUP2 has at least one segment SEG2 which is configured for connecting the second coupling body KUP2 to a second end ASP2 of the elastic coupling element KUPEL.

This connection is in this case designed in such a way that the above-described position of the longitudinal axis of the elastic coupling element KUPEL in the plane which is perpendicular to the rotational axis ROTA is realized.

In this case, the second end ASP2 of the elastic coupling element KUPEL is arranged so as to be opposite to the first end ASP1 of the elastic coupling element KUPEL.

The elastic coupling element KUPEL is arranged in the coupling region KUPB, and connected to the two coupling bodies KUP1, KUP2 by way of the segments SEG1, SEG2, in such a way that the coupling bodies KUP1, KUP2 can be displaced in the radial direction, that is to say perpendicularly with respect to the rotational axis ROTA.

In the case of a displacement of the two coupling bodies KUP1, KUP2 in the radial direction, a restoring force is effected due to the elasticity of the coupling element KUPEL.

As described, the elastic coupling element KUPEL is arranged in the coupling region KUPB, and connected to the two coupling bodies KUP1, KUP2 by way of the segments SEG1, SEG2, in such a way that the elastic coupling element KUPEL can also be displaced in the axial direction, that is to say longitudinally with respect to the rotational axis ROTA.

In this case, a displacement of the coupling bodies KUP1, KUP2 along the rotational axis ROTA does not result in an axially acting restoring force.

In the case of an axial displacement, the elastic coupling element KUPEL is always oriented in a plane perpendicular to the rotational axis. A transmitted torque therefore no longer leads to an axially acting force, which constitutes an undesirable restoring force.

In sum, this results in cancellation of the above-described coupling between axially acting force and transmitted torque.

FIG. 2 shows a further basic illustration of an advantageous refinement of the present invention in respect of FIG. 1.

In this case, the first end ASP1 of the elastic coupling element KUPEL is additionally connected to an inner side of the first coupling body KUP1 in a resilient manner.

This inner side is oriented perpendicularly with respect to the rotational axis ROTA. In addition, the inner side points toward the interior of the three-dimensional coupling region KUPB.

Correspondingly, the second end ASP2 of the elastic coupling element KUPEL is additionally connected to an inner side of the second coupling body KUP2 in a resilient manner.

This inner side is oriented perpendicularly with respect to the rotational axis ROTA. In addition, the inner side points toward the interior of the three-dimensional coupling region KUPB.

In this preferred refinement, the at least one elastic coupling element KUPEL is connected to the two coupling bodies KUP1, KUP2 in such a way that, in respect of FIG. 1, the compensating coupling AKUP additionally also has a defined rigidity in the axial direction, that is to say longitudinally with respect to the rotational axis ROTA. As described below, this may be realized with the aid of a spiral spring, for example.

The rigidity is defined by way of the specific resilient connection.

FIG. 3 to FIG. 7 show a specific configuration of the invention.

FIG. 3 shows a detail of a running gear of a rail vehicle, in which the compensating coupling AKUP according to the invention is used.

A first coupling body KUP1 can be seen, which is connected to a first flange plate FLP1. A first shaft (not illustrated here) can be connected by way of its hole circle to the first coupling body KUP1.

A second coupling body KUP2 can be seen, which is connected to a second flange plate FLP2. A second shaft (not illustrated here) can be connected by way of its hole circle to the second coupling body KUP2.

The two coupling bodies KUP1, KUP2 are in the form of flat cylinders, the diameters of which are greater than the respective height thereof by a multiple.

A multiplicity of strip-like or cuboid elastic coupling elements KUPEL can also be seen, which connect the two coupling bodies KUP1, KUP2 to one another.

The elastic coupling elements KUPEL have respective longitudinal axes. Divided into groups, these longitudinal axes lie in respective planes which are perpendicular to the rotational axis ROTA of the compensating coupling AKUP.

The first coupling body KUP1 has a multiplicity of segments SEG1 which are configured for connecting the first coupling body KUP1 to first ends ASP1 of the elastic coupling elements KUPEL.

In this case, the second end ASP2 of the respective elastic coupling element KUPEL is arranged so as to be opposite to the first end ASP1 of the respective elastic coupling element KUPEL.

Figure 4:
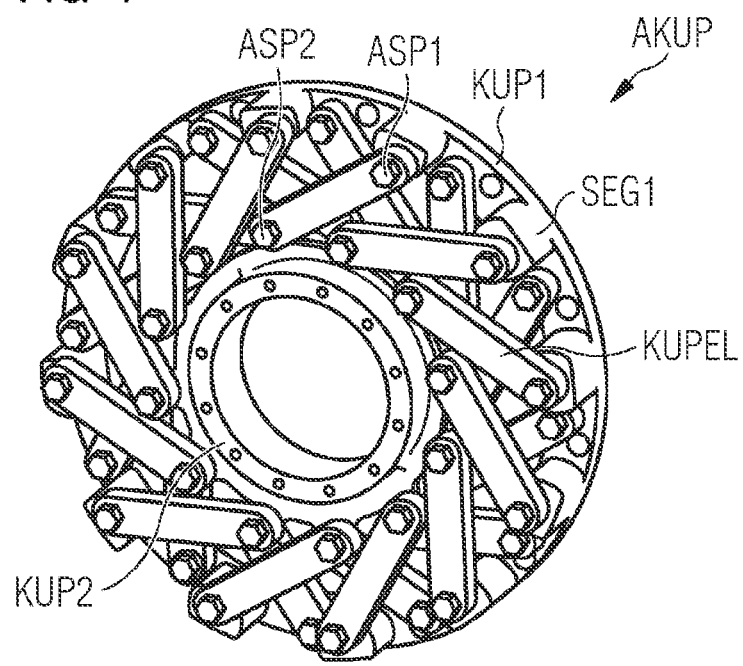
FIG. 4 shows a detailed view of a compensating coupling of FIG. 3.
Figure 5:
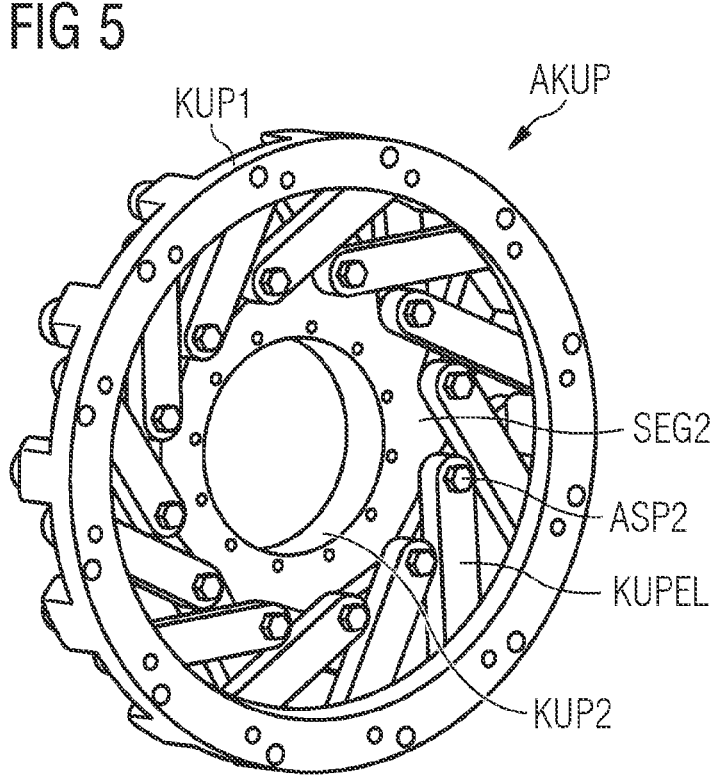
FIG. 5 shows a detailed view of the compensating coupling of FIG. 3.

FIG. 4 and FIG. 5 show two detailed views of the compensating coupling AKUP in respect of FIG. 3.

The second coupling body KUP2 likewise has a multiplicity of segments SEG2 which are configured for connecting the second coupling body KUP2 to respective second ends ASP2 of the elastic coupling elements KUPEL.

Figure 6:
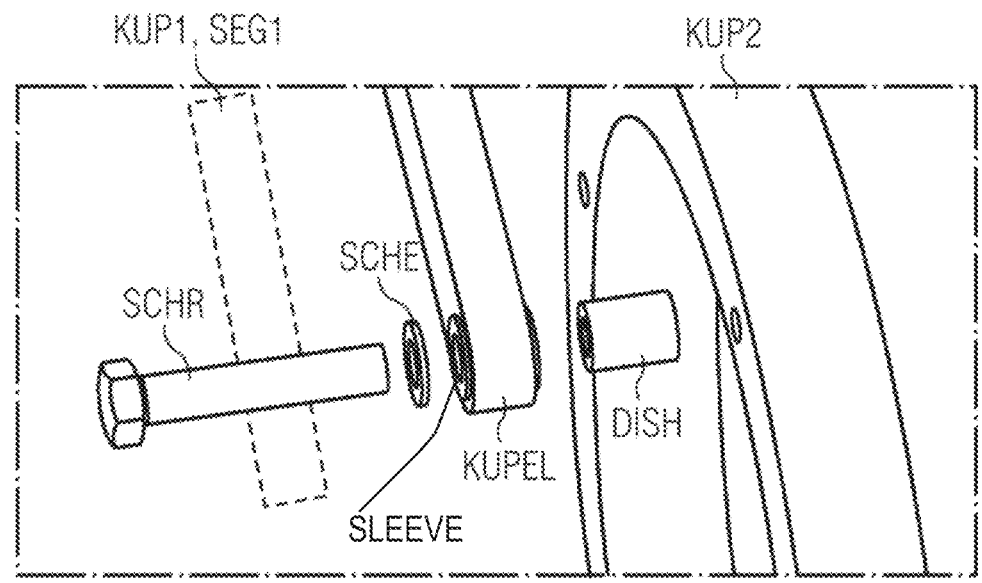
FIG. 6 is an exploded view of the compensating coupling of FIGS. 3-5.

FIG. 6 shows an exploded drawing in respect of figures FIG. 3 to FIG. 5, in order to illustrate by way of example the connecting situation of the essential elements of the compensating coupling AKUP.

The elastic coupling element KUPEL includes, at one of its ends or at both ends, a metal insert SLEEVE, which is laminated in the form of a sleeve into the elastic coupling element KUPEL.

The first coupling body KUP1 or its first segment SEG1 has a screw SCHR, which braces a spacer sleeve DISH.

A disk SCHE, which constitutes an axial stop for the elastic coupling element KUPEL in the case of an axial displacement, is preferably located between the head of the screw SCHR and the spacer sleeve DISH.

The laminated-in sleeve of the elastic coupling element KUPEL is pushed over the spacer sleeve DISH, and the elastic coupling element KUPEL is thus connected to the first coupling body KUP1.

The use of the spacer sleeve DISH achieves a situation in which the elastic coupling element KUPEL can be displaced in the axial direction, that is to say longitudinally with respect to the rotational axis of the compensating coupling AKUP.

A pivot/sliding joint is realized by way of the spacer sleeve DISH and the laminated-in sleeve of the elastic coupling element KUPEL. As a result, the elastic coupling element KUPEL can be displaced in the axial direction, that is to say longitudinally with respect to the rotational axis of the screw SCHR, which is preferably parallel to the rotational axis ROTA of the compensating coupling AKUP.

In addition, the elastic coupling element KUPEL can be rotated about the rotational axis of the screw SCHR.

As described above, this has the effect that a displacement of the coupling bodies KUP1, KUP2 along the rotational axis of the compensating coupling AKUP does not result in an axially acting restoring force.

Figure 7:
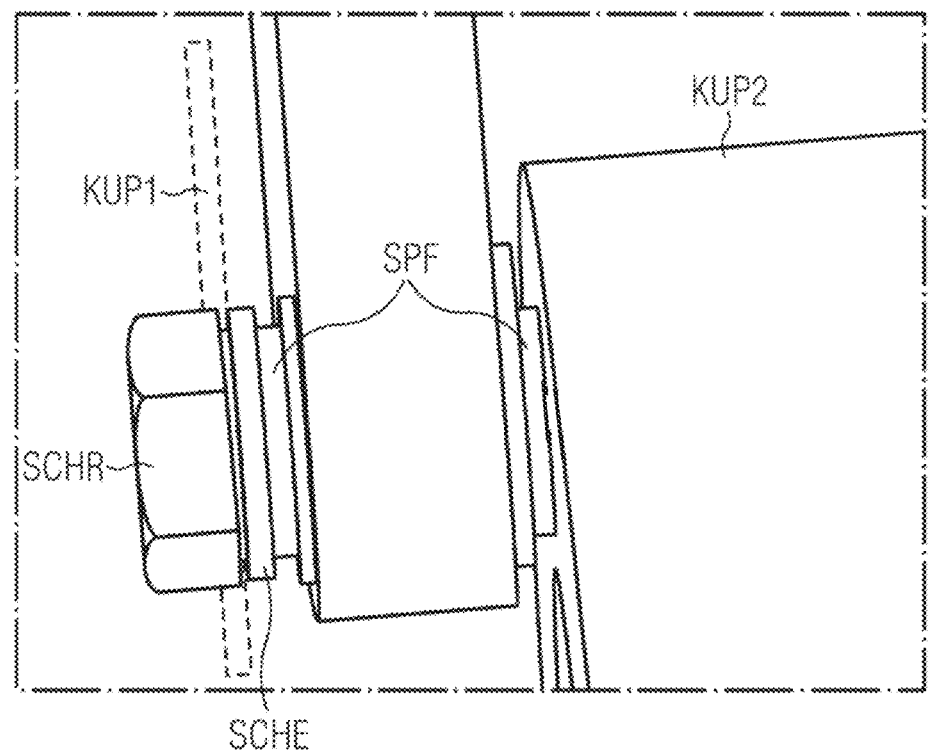
FIG. 7 is an enlarged view of the coupling shown in FIG. 6.

FIG. 7 shows, in respect of FIG. 6, a specific configuration of the advantageous refinement previously described in FIG. 2.

In this case, the additional resilient support described in FIG. 2 is realized by way of example by two spiral springs SPF which are arranged on two opposite sides of the elastic coupling element KUPEL and which cooperate with the screw connection described in FIG. 6.

In this preferred refinement, the compensating coupling AKUP has a defined rigidity in the axial direction, that is to say longitudinally with respect to the rotational axis of the compensating coupling, said rigidity being caused by the two spiral springs SPF.

The invention claimed is:

1. A compensating coupling for connecting a first shaft to a second shaft along a rotational axis, the compensating coupling comprising:

two coupling bodies, including a first coupling body to be connected to an end of the first shaft and a second coupling body to be connected to an end of the second shaft;
at least one elastic coupling element, said at least one elastic coupling element having a first end, a second end, and a longitudinal axis lying in a plane oriented perpendicular with respect to the rotational axis;
said two coupling bodies being arranged relative to one another to form a three-dimensional coupling region in which said at least one elastic coupling element is arranged between said two coupling bodies;
said at least one elastic coupling element being connected to said two coupling bodies to allow a displacement of said two coupling bodies in a radial direction with respect to the rotational axis;
said at least one elastic coupling element being connected to said two coupling bodies to allow a displacement of said at least one coupling element in an axial direction with respect to the rotational axis;
said first coupling body being connected to an end of the first shaft and said second coupling body being connected to an end of the second shaft, such that respective longitudinal axes of the first and second shafts coincide with the rotational axis;
said two coupling bodies being rotationally symmetrical with respect to the rotational axis;
said at least one elastic coupling element being formed of a fiber-reinforced polymer, and said at least one elastic coupling element having a strip-shaped configuration;
said first coupling body having a segment which is configured for connecting said first coupling body to said first end of said elastic coupling element, with the connection being configured to cause the longitudinal axis of said at least one elastic coupling element to lie in a plane perpendicular to the rotational axis;
said second coupling body having a segment which is configured for connecting said second coupling body to said second end of said at least one elastic coupling element, with the connection being configured to cause the longitudinal axis of said at least one elastic coupling element to lie in the plane perpendicular to the rotational axis;
said at least one elastic coupling element including, at one end or at both ends thereof, a metal insert that is laminated in a form of a sleeve into said at least one elastic coupling element;
said segment of said first coupling body having a screw that braces a spacer sleeve, said screw having a head and having a rotational axis;
a disk disposed between said head of said screw and said spacer sleeve, said disk forming an axial stop for said at least one elastic coupling element in a case of an axial displacement;
said laminated-in sleeve of said at least one elastic coupling element being pushed over said spacer sleeve to thereby connect said at least one elastic coupling element to said first coupling body;
said spacer sleeve enabling said at least one elastic coupling element to be displaced in the axial direction extending longitudinally with respect to the rotational axis of the compensating coupling; and
said at least one elastic coupling element being rotatable about the rotational axis of said screw.

2. The compensating coupling according to claim 1, wherein said first end of said at least one elastic coupling element is resiliently connected to an inner side of said first coupling body, wherein the inner side is oriented perpendicularly with respect to the rotational axis, and the inner side points towards an interior of said three-dimensional coupling region.

3. The compensating coupling according to claim 1, wherein said second end of said at least one elastic coupling element is resiliently connected to an inner side of said second coupling body, wherein the inner side is oriented perpendicularly with respect to the rotational axis, and the inner side points toward an interior of the three-dimensional coupling region.

* * * * *